(12) United States Patent
Lee et al.

(10) Patent No.: US 12,225,956 B2
(45) Date of Patent: Feb. 18, 2025

(54) AUTOMATED OR TELE-OPERATED MEANS FOR WEARING AN UPPER GARMENT

(71) Applicant: AUTOMATION FOR HUMANITY GLOBAL HOLDINGS SP..Z.O.O., Wroclaw (PL)

(72) Inventors: Ka Shek Neville Lee, Hong Kong (CN); Chi Kit Chan, Hong Kong (CN)

(73) Assignee: AUTOMATION FOR HUMANITY GLOBAL HOLDINGS SP..Z.O.O., Wroclaw (PL)

( * ) Notice: Subject to any disclaimer, the term of this patent is extended or adjusted under 35 U.S.C. 154(b) by 93 days.

(21) Appl. No.: 17/978,069

(22) Filed: Oct. 31, 2022

(65) Prior Publication Data

US 2023/0051966 A1 Feb. 16, 2023

Related U.S. Application Data

(63) Continuation of application No. PCT/CN2021/092998, filed on May 11, 2021.

(60) Provisional application No. 63/022,594, filed on May 11, 2020.

(51) Int. Cl.
*A61G 7/05* (2006.01)
*A41D 13/12* (2006.01)
*A61G 7/16* (2006.01)

(52) U.S. Cl.
CPC ....... *A41D 13/129* (2013.01); *A41D 13/1245* (2013.01); *A61G 7/05* (2013.01); *A61G 7/16* (2013.01); *A61G 2203/22* (2013.01)

(58) Field of Classification Search
CPC .. A41D 13/129; A41D 13/1245; A47G 25/90; A61G 7/015; A61G 7/05; A61G 7/10; A61G 7/16; A61G 2203/22; B25J 11/008
See application file for complete search history.

(56) References Cited

U.S. PATENT DOCUMENTS 5,501,376 A * 3/1996 Roda-Balzarini ...... A47G 25/90
 223/111
5,564,123 A * 10/1996 Grassick ............ A41D 13/1245
 2/70
5,603,123 A * 2/1997 Chupa .................. A41D 13/129
 2/912

(Continued)

FOREIGN PATENT DOCUMENTS

CN 102631124 A * 8/2012
CN 106377366 A * 2/2017 .......... A61G 7/0005

(Continued)

*Primary Examiner* — F Griffin Hall
(74) *Attorney, Agent, or Firm* — JEEN IP LAW, LLC

(57) ABSTRACT

An upper garment dresser for providing automatic or tele-controlled upper garment dressing of a patient, said upper garment dresser includes: means for picking up an upper garment from a default position, means for positioning a back portion of the upper garment behind a patient's back, and means for positioning a front portion of the upper garment in front of the patient; whereby during dressing, an upper body of the patient is pulled forward to expose the back and upright to expose the front; and whereby during such movement backwards and forwards, the upper garment can be flipped over the head of the patient, and its back and front parts secured together.

13 Claims, 13 Drawing Sheets

(56) References Cited

U.S. PATENT DOCUMENTS

| | | | | |
|---|---|---|---|---|
| 5,836,310 A * | 11/1998 | Winters | ............... | A61F 5/3784 |
| | | | | 128/845 |
| 6,282,718 B1 * | 9/2001 | Drakford | ............... | A41D 15/00 |
| | | | | 2/70 |
| 6,378,148 B1 * | 4/2002 | Votel | .................. | A61G 7/1044 |
| | | | | 5/81.1 R |
| 6,934,980 B2 * | 8/2005 | Harney | ............... | A61G 7/1046 |
| | | | | 5/81.1 R |
| 7,596,814 B1 * | 10/2009 | Corby | ............... | A41D 13/1263 |
| | | | | 2/114 |
| 8,607,378 B2 * | 12/2013 | Moriarity | ............ | A61G 7/1076 |
| | | | | 5/85.1 |
| 8,990,978 B2 * | 3/2015 | Pearson | ............... | A61G 7/1053 |
| | | | | 5/81.1 R |
| 9,492,339 B2 * | 11/2016 | Leib | ....................... | A61G 7/10 |
| 10,406,053 B2 * | 9/2019 | Stanislao | ............... | A61G 7/015 |
| 2008/0256708 A1 * | 10/2008 | Park | ....................... | A61G 7/02 |
| | | | | 5/604 |
| 2011/0119803 A1 * | 5/2011 | Giroux | ............... | A41D 13/129 |
| | | | | 2/113 |
| 2020/0068960 A1 * | 3/2020 | Oliver | .................. | A41D 13/129 |
| 2020/0179202 A1 * | 6/2020 | Stocker | ............... | A61G 7/1019 |
| 2022/0000690 A1 * | 1/2022 | Fox | ....................... | A61G 7/1026 |
| 2022/0008267 A1 * | 1/2022 | Nomura | ............... | A61G 7/1086 |

FOREIGN PATENT DOCUMENTS

| | | | | |
|---|---|---|---|---|
| CN | 106389035 A * | 2/2017 | ............ | A61G 7/001 |
| CN | 107802436 A * | 3/2018 | ............ | A47G 25/90 |
| CN | 111214083 A * | 6/2020 | ............ | A47G 25/90 |

* cited by examiner

AUTOMATED OR TELE-OPERATED MEANS FOR WEARING AN UPPER GARMENT

CROSS-REFERENCE TO RELATED APPLICATION

This application claims the benefit of U.S. application No. 63/022,594, filed on May 11, 2020, titled "AUTOMATED OR TELE-OPERATED MEANS FOR WEARING AN UPPER GARMENT". The entire disclosure of the above-referenced application is incorporated herein by reference in entirety for all purpose.

TECHNICAL FIELD

This application relates to the field of caregiving, and more particularly, to an upper garment dresser for providing automatic or tele-controlled upper garment dressing of a patient.

BACKGROUND

In caregiving, dressing of a patient is a very manual process and currently the responsibility of an in-person attendant or caregiver if the patient is unable to put on clothing on their own.

In the prior art there are dressing aids to be used by a patient themselves, but very little that can help those who cannot dress on their own. Some researcher have attempted to teach robots to help identify and pull on garments—but so far these experiments have demonstrated significant error and limitations under even the most stringent of controlled environments.

As a result, for those who require assistance, dressing is a very labour-intensive caregiving task.

SUMMARY

One example embodiment provides an upper garment dresser for providing automatic or tele-controlled upper garment dressing of a patient, the upper garment dresser includes:

means for picking up an upper garment from a default position, means for positioning a back portion of the upper garment behind a patient's back, and means for positioning a front portion of the upper garment in front of the patient;

whereby during dressing, an upper body of the patient is pulled forward to expose the back and upright to expose the front;

and whereby during such movement backwards and forwards, the upper garment can be flipped over the head of the patient, and its back and front parts secured together.

Preferably, the back and front parts of the upper garment can be secured together at their sides.

BRIEF DESCRIPTION OF THE DRAWINGS

The present application will now be described, by way of example, with reference to the accompanying drawings, in which.

DETAILED DESCRIPTION

The purpose of the present application is to provide automated or tele-controlled means for putting on an upper garment. This reduces or eliminates the need for in-person assistance for putting on an upper garment.

The present application involves an upper garment dresser for automatic or tele-controlled upper garment dressing by a remote operator, the upper garment dresser including means for picking up an upper garment from a default position, means for positioning a back portion of the upper garment behind a patient's back, and means for positioning a front portion of the upper garment in front of the patient.

Complementary devices are used to pull the upper body of the patient forward to expose the back and upright to expose the front. During such movement backwards and forwards, the garment can be flipped over the head of the patient and back and front parts secured together at their sides.

Furthermore, the proposed solution is preferably meant to work alongside an automatic transfer bed and/or Companion Robot Transfer Assistant.

FIG. 1 to FIG. 12 depict an embodiment of the present application of an upper garment dresser 100. The upper garment dresser 100 preferably works alongside an automatic transfer bed 500 (disclosed in PCT/CN2019/119519) and/or a companion robot transfer assistant 400 although it should be noted that other complementary devices that can perform the actions required of shifting the patient's upper body upwards, forwards and backwards may also work. The automatic transfer bed 500 and companion robot transfer assistant 400 have the added advantage of being able to move a patient laterally to a compatible wheelchair (not shown) which are the subject of other applications.

Figure 1:
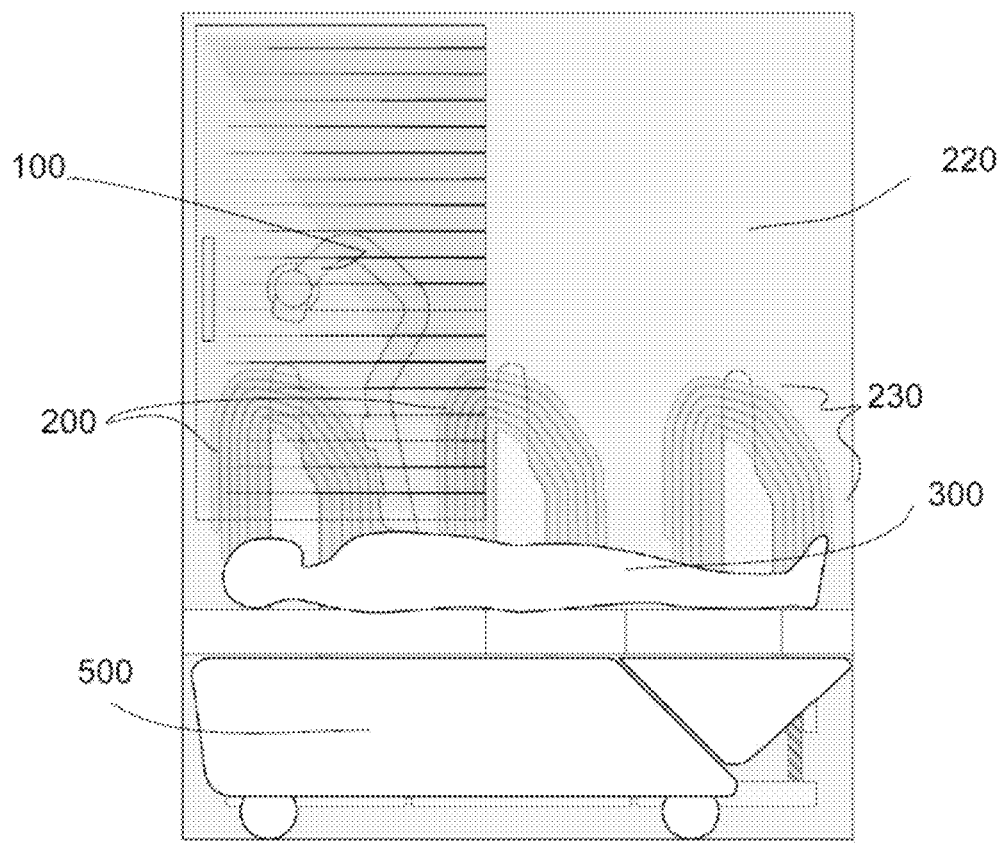
FIG. 1 is a schematic diagram of an upper garment dresser according to an embodiment of the present application.

In FIG. 1, the upper garment dresser 100 includes means for grasping an upper garment 200 that is preferably lying in a ready position. Optionally the upper garment 200 may be arranged in stacks 230 in a set layout within a wardrobe 220. The means for grasping an upper garment 200 optionally included suction means 102 as in FIG. 13 or as some sort of other grasping means (e.g., clamp, magnet, etc.)

Figure 2:
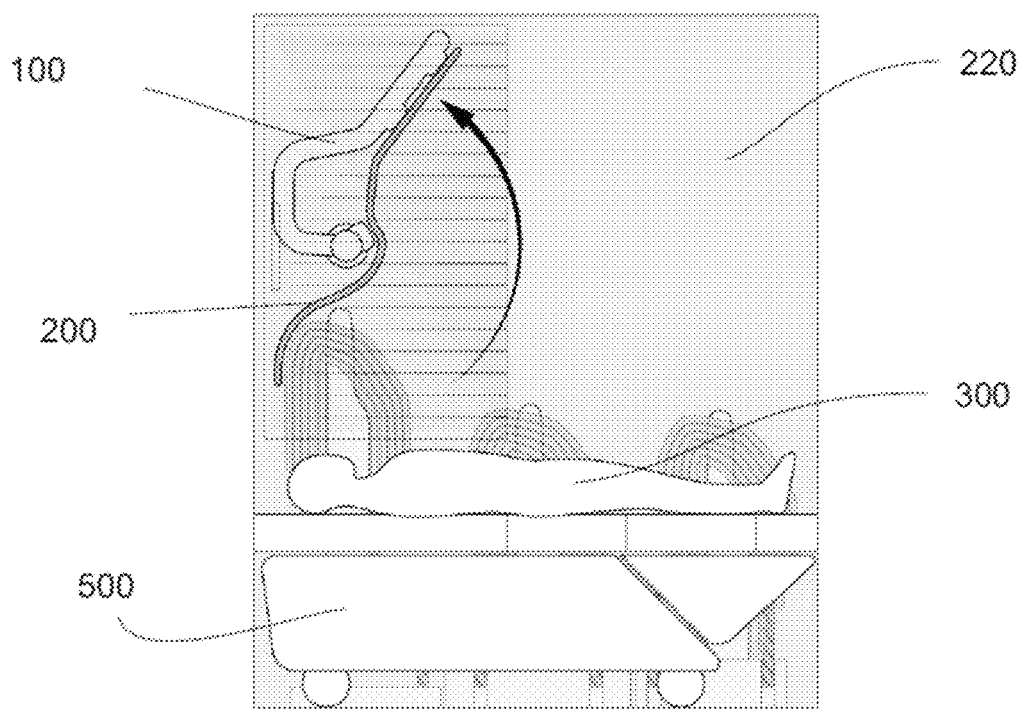
FIG. 2 is a schematic diagram showing an upper garment dresser grasping an upper garment according to an embodiment of the present application.

In FIG. 2, the upper garment dresser 100 grasps the upper garment 200. Preferably this is done by rotating or movement of the upper garment dresser 100 and use of suction.

For best performance, optionally there are parts of the upper garment 200 that are purposefully designed for suction or grasping.

Figure 3:
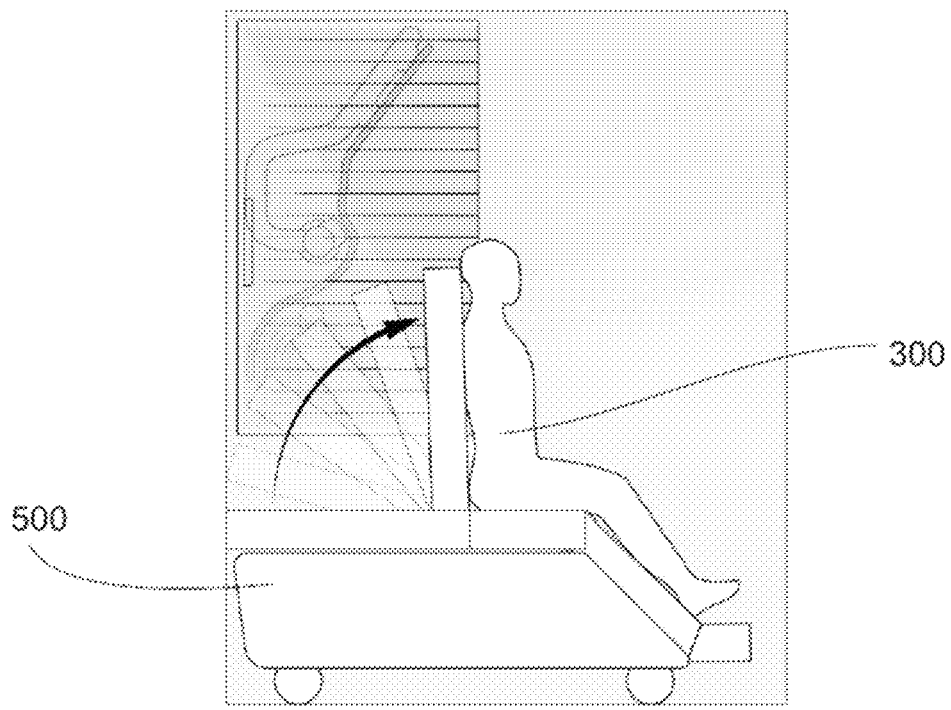
FIGS. 3 to 6 are schematic diagrams showing the back of a patient exposed by complementary devices according to an embodiment of the present application.
Figure 4:
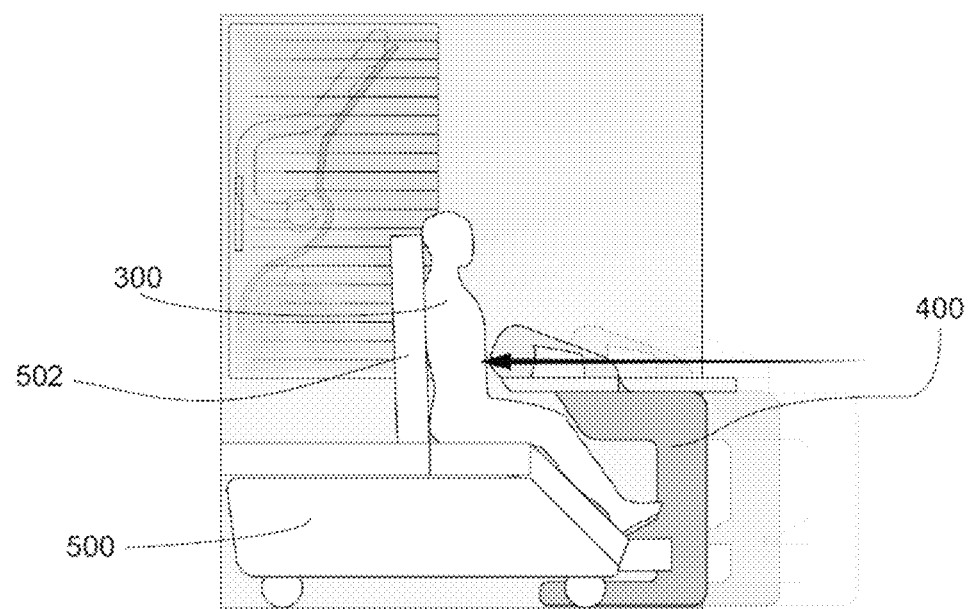
Figure 5:
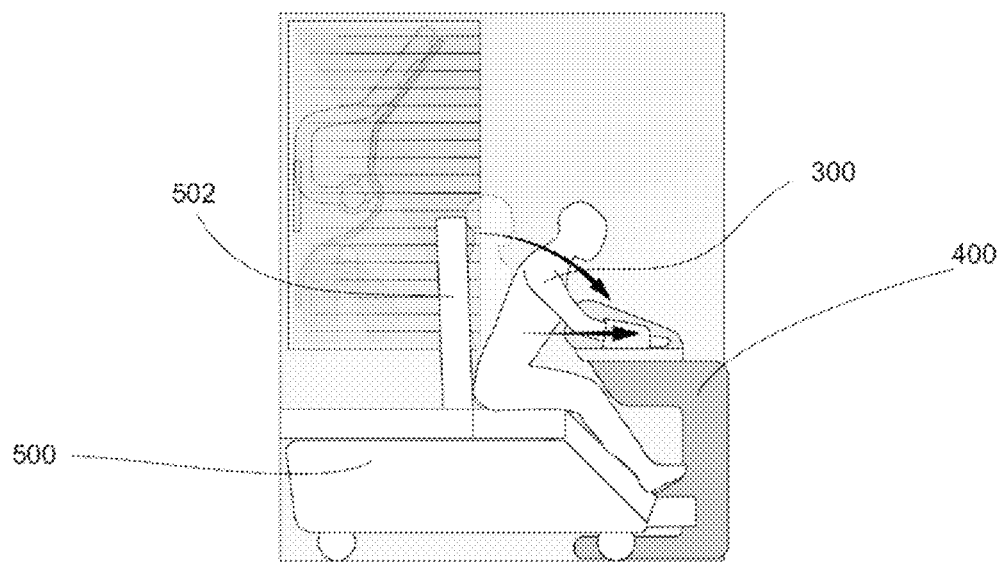
Figure 6:
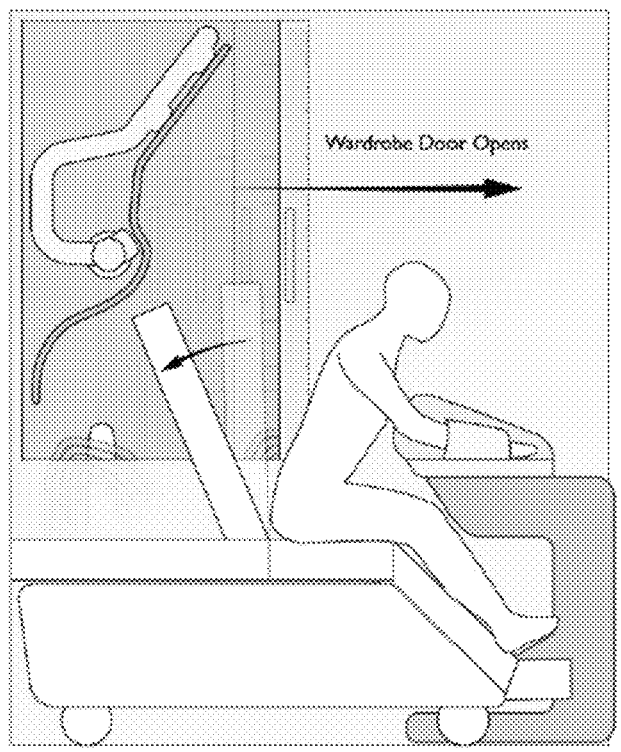
Figure 7:
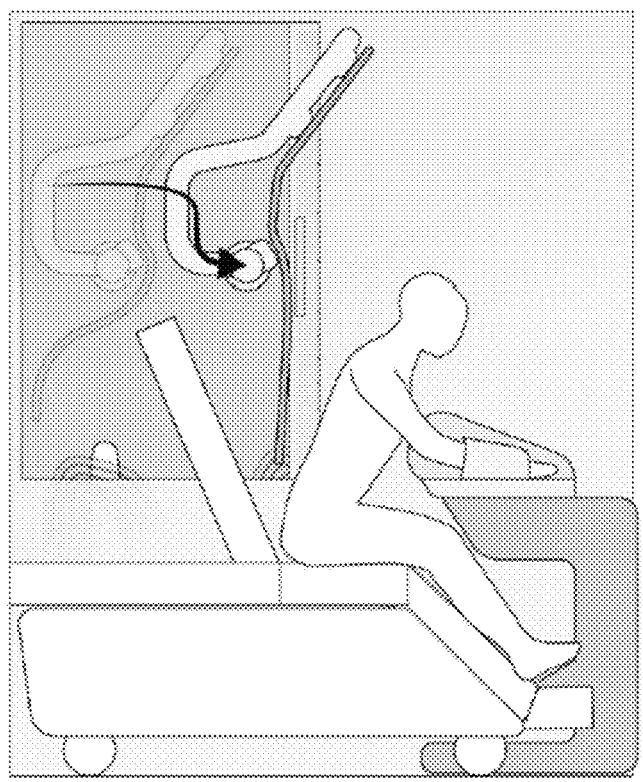
FIGS. 7 to 9 are schematic diagrams showing the back of the patient being against an inside back of an upper garment according to an embodiment of the present application.
Figure 8:
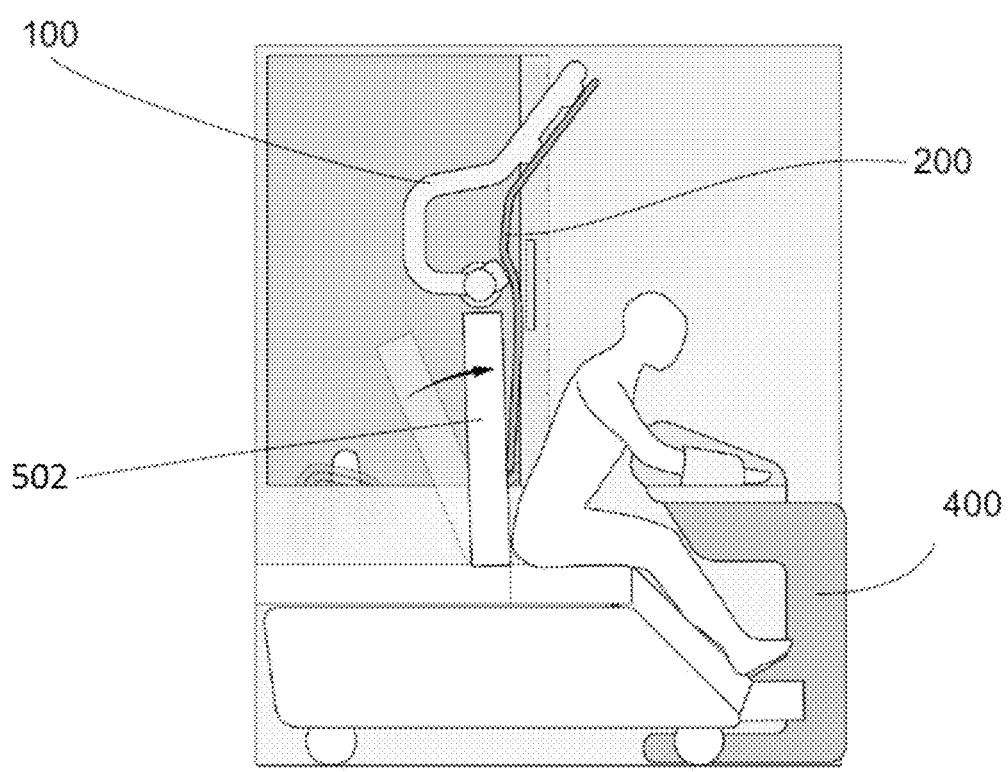
Figure 9:
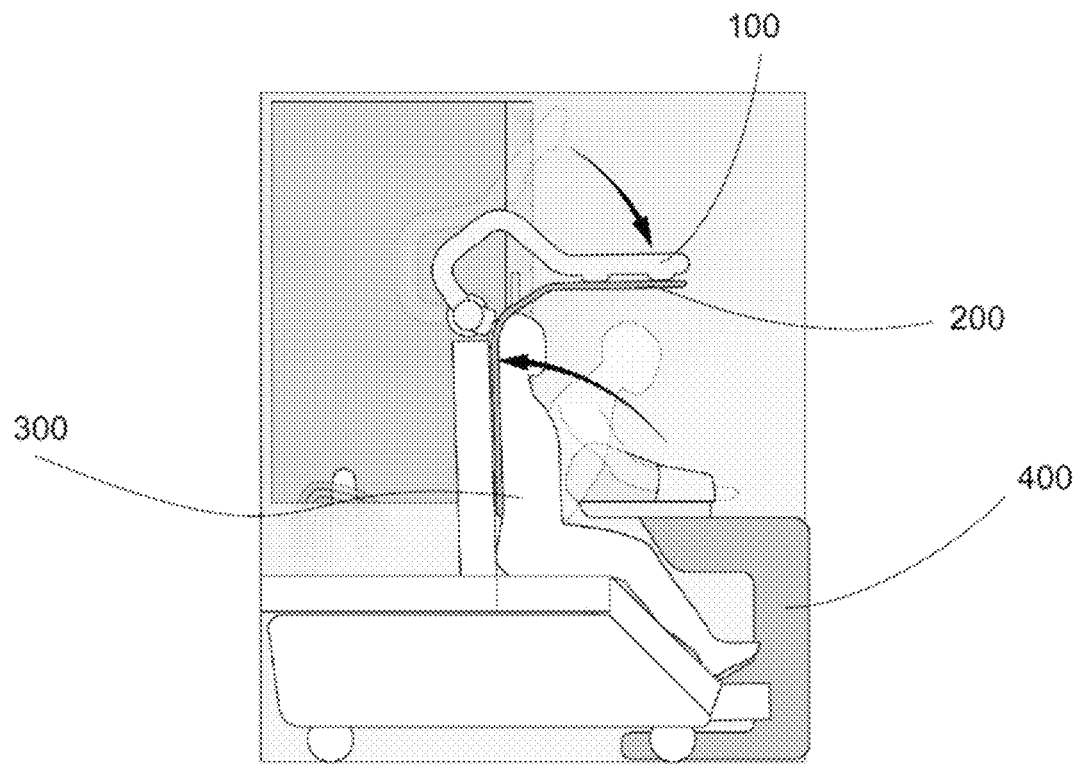
Figure 10:
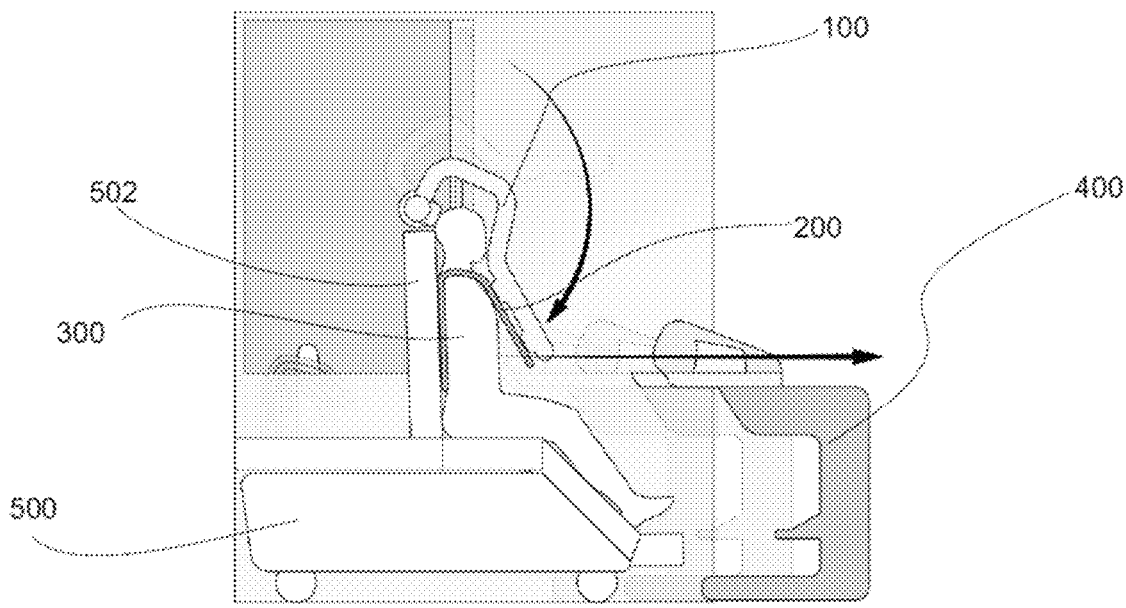
FIG. 10 is a schematic diagram showing the front part of an upper garment falling in place in front of a patient according to an embodiment of the present application.

The patient 300 is arranged to sit in an upright position as in FIG. 3. The companion robot transfer assistant 400 secures the patient 300 preferably by grasping their raised arms and pulls the patient 300 forward (as in FIG. 5) while the backrest 502 of the bed 500 reclines downwards and backwards (as in FIG. 6). The upper garment dresser 100 can then bring the upper garment 200 behind the patient's back as in FIGS. 6 and 7. When the backrest 502 of the bed 500 comes back upright, the companion robot transfer assistant 400 can then push the patient 300 back upright so that their back is against an inside back of the upper garment 200 (as in FIG. 9). The rest of the upper garment 200 can then be lowered over the front of the patient 200 by the upper garment dresser 100 possibly by flipping it over the head so that the front part falls in place in front of the patient (FIG. 10). Preferably the upper garment dresser 100 also includes means to secure the front and back of the upper garment 200 on either side of the patient. More preferably the front and back of the upper garment 200 can be secured by Velcro or other straps or buttons.

Figure 11:
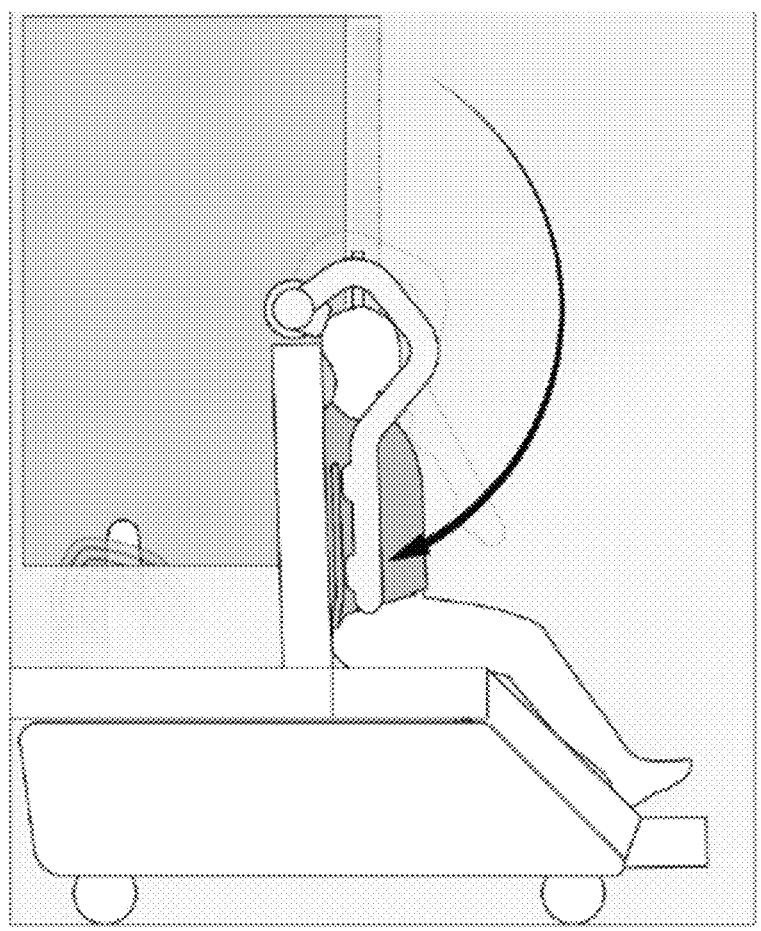
FIGS. 11 to 12 are schematic diagrams showing an upper garment dresser securing the front and back of an upper garment together.
Figure 12:
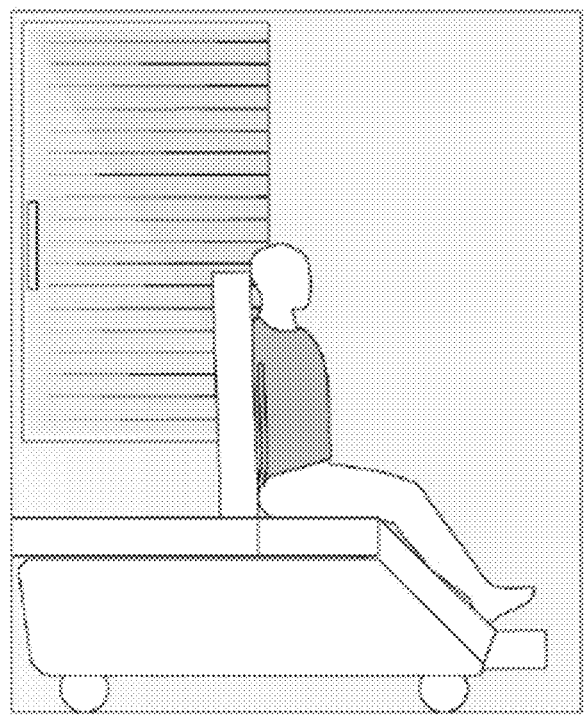

FIGS. 11 and 12 depict a scenario where the upper garment dresser 100 helps secure the front and back of the upper garment together and then is stored away.

Preferably the upper garment 200 includes a front and back construction joined by flaps. Optionally the upper garment includes special features to make grasping easier.

Figure 13A:
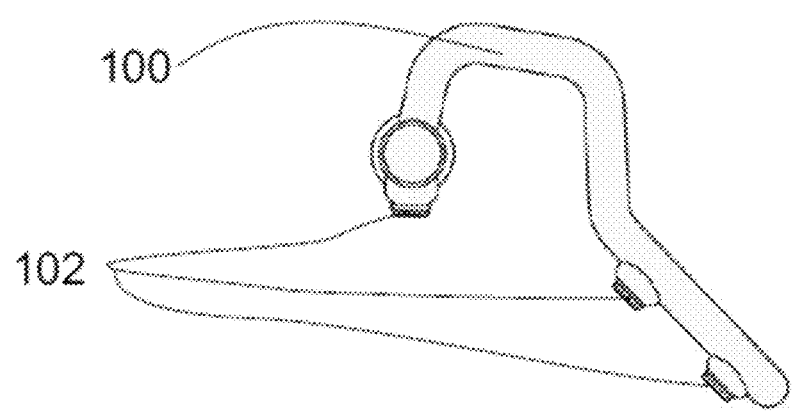
FIGS. 13*a* and 13*b* are schematic diagrams of an upper garment dresser with suction means according to an embodiment of the present application.
Figure 13B:
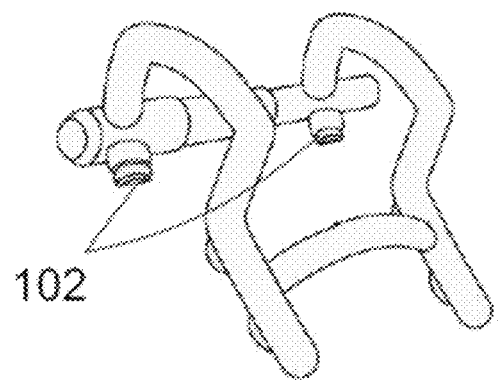

FIGS. 13a and 13b depict side and front views of an embodiment of a potential upper garment dresser 100 with suction means 102 for grasping a unit of upper garment 200. Preferably the upper garment dresser 100 has left and right sides and upper and lower parts for grabbing the upper garment on multiple points.

Figure 14A:
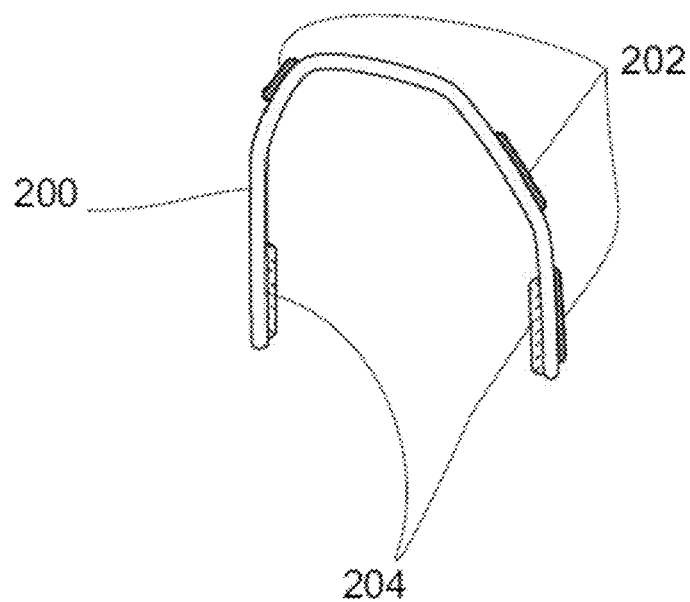
FIGS. 14*a* and 14*b* are schematic diagrams of an upper garment with machine-friendly grabbing areas and Velcro straps according to an embodiment of the present application.
Figure 14B:
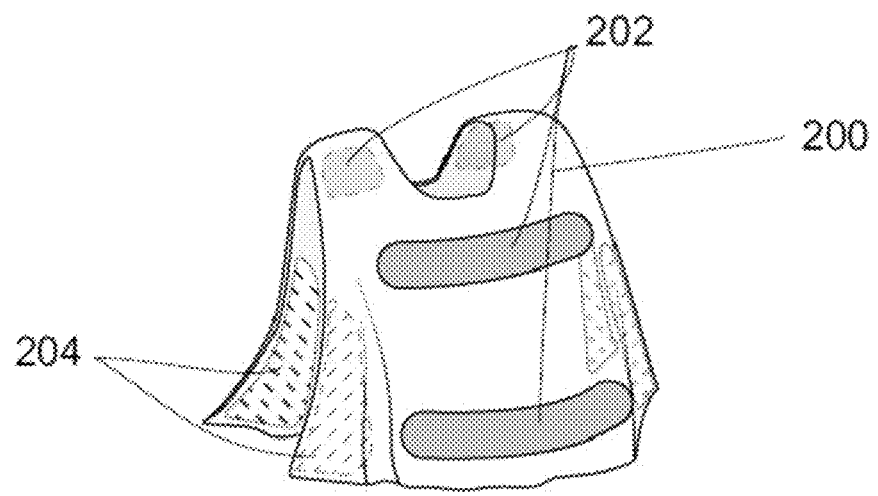
Figure 15A:
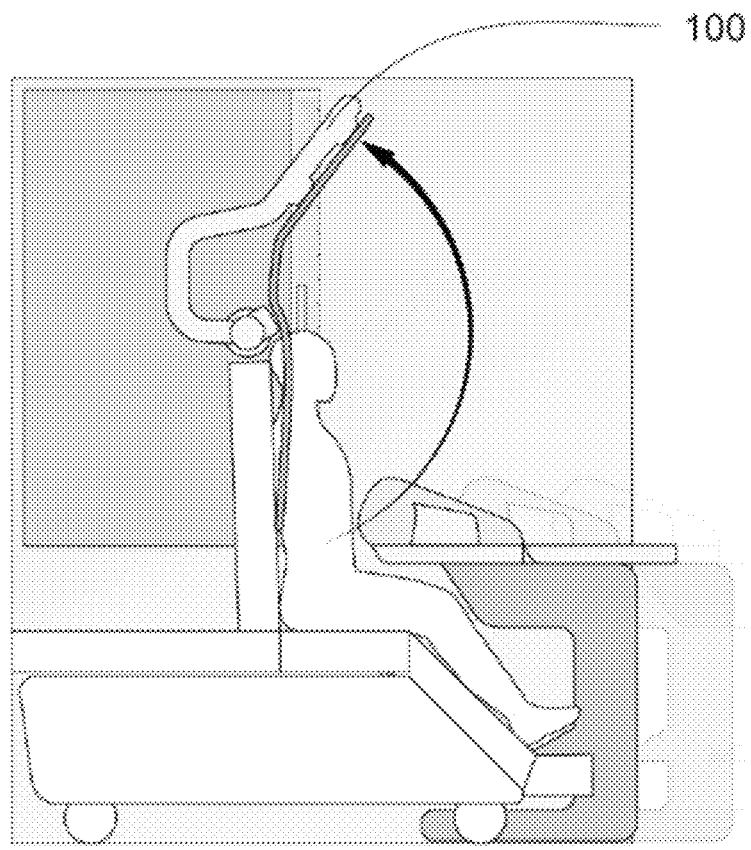
FIGS. 15*a* to 15*e* are schematic diagrams showing an upper garment dresser removing an upper garment according to an embodiment of the present application.
Figure 15B:
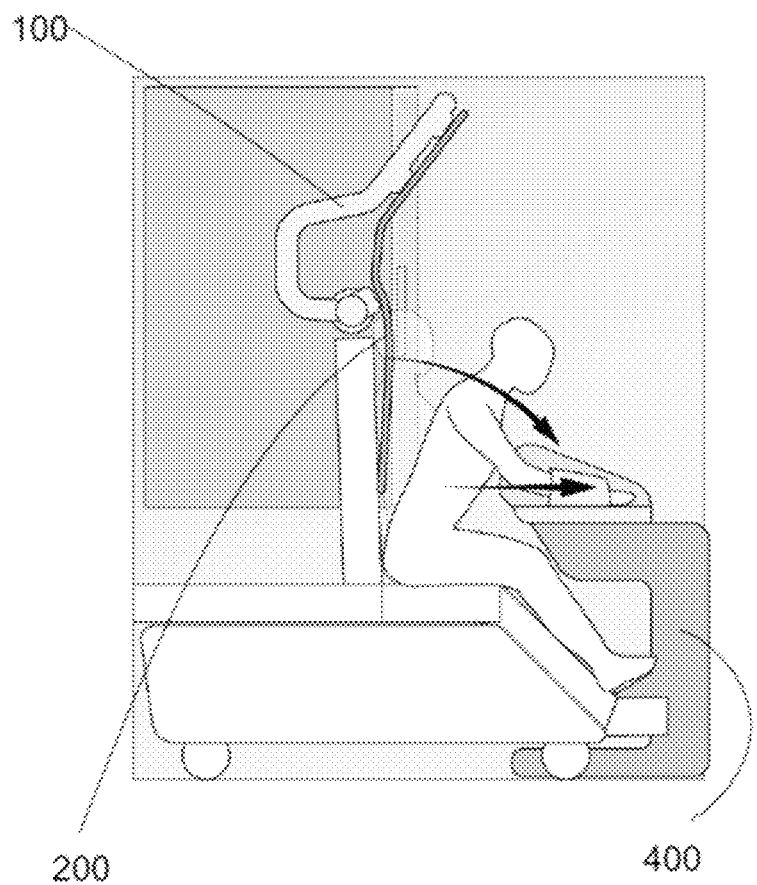
Figure 15C:
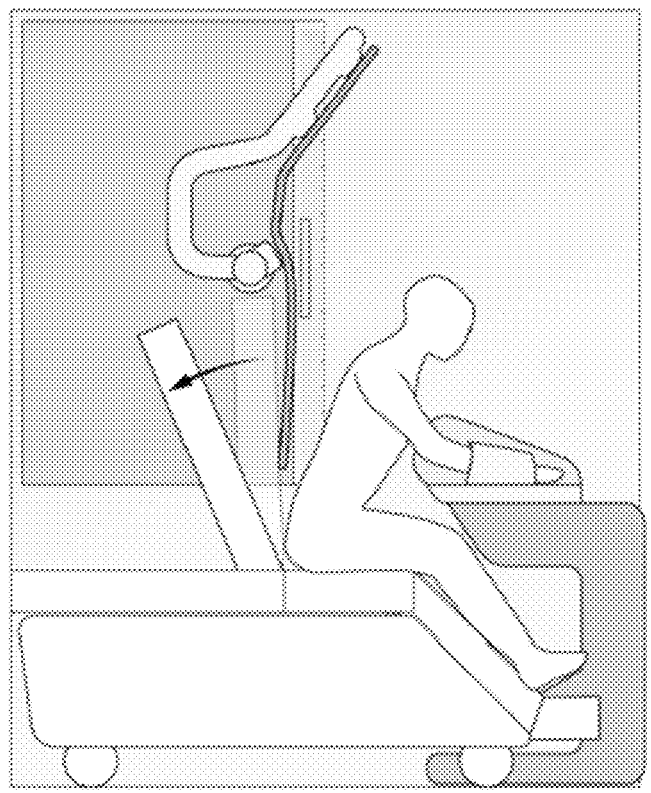
Figure 15D:
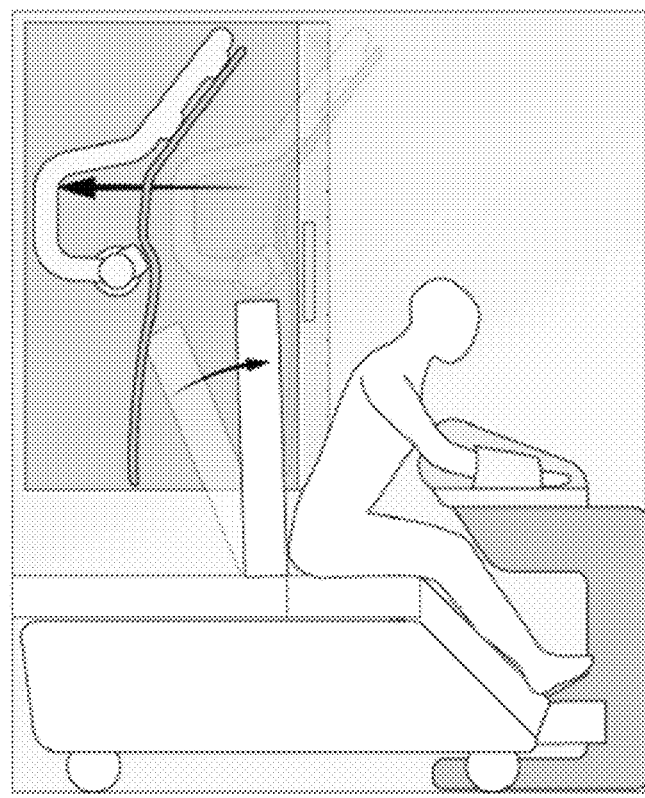
Figure 15E:
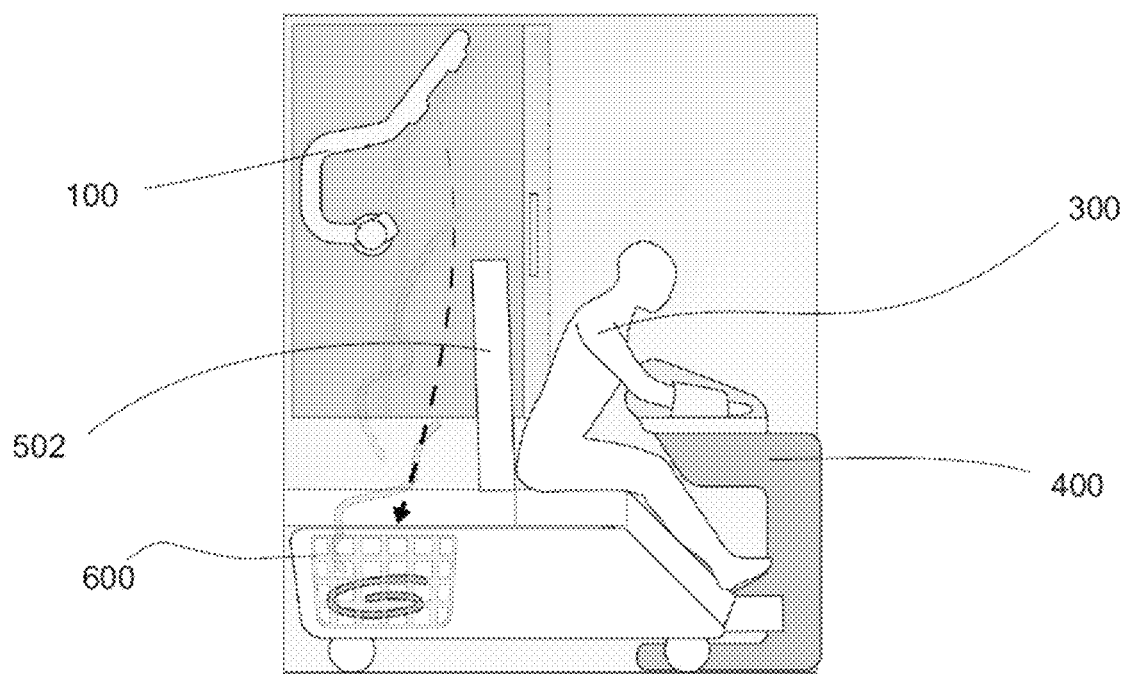

More preferably FIGS. 14a and 14b depict side and front views of an embodiment of a potential upper garment 200 with machine-friendly grabbing areas 202 designed to be easier to grab or sensed by a machine or the upper garment dresser 100. The upper garment 200 is preferably joined at the top but otherwise free to open up. More preferably there are Velcro straps 204 or other similar attachment mechanisms that can make joining the front and back easier along the sides and bottom.

FIGS. 15a to 15e depict how the upper garment dresser 100 can be used to first remove the front part of the upper garment by lifting it up and allow the companion robot transfer assistant 400 to secure the patient 300 and pull them forward. The back of the upper garment 200 can then be removed and dropped into a laundry basket 600.

The invention claimed is:

1. An upper garment dresser for providing automatic or tele-controlled upper garment dressing of a patient, said upper garment dresser comprising:

a. means for picking up an upper garment from a default position,
   b. means for positioning a back portion of the upper garment behind a patient's back, and
   c. means for positioning a front portion of the upper garment in front of the patient;
   whereby during dressing, an upper body of the patient is pulled forward to expose the back and upright to expose the front;
   and whereby during such movement backwards and forwards, the upper garment can be flipped over the head of the patient, and its back portion and front portion secured together.

2. The upper garment dresser as claimed in claim 1, wherein complementary devices are used to pull the upper body of the patient forward to expose the back and upright to expose the front.

3. The upper garment dresser as claimed in claim 2, wherein said complementary devices comprise an automatic transfer bed or a companion robot transfer assistant that can also help transfer a patient laterally to a wheelchair.

4. The upper garment dresser as claimed in claim 3, wherein said automatic transfer bed can be adapted into an upright sitting position.

5. The upper garment dresser as claimed in claim 3, wherein said companion robot transfer assistant can grasp the arms of the patient to pull them forward.

6. The upper garment dresser as claimed in claim 3, wherein said companion robot transfer assistant can push the patient back upright against a backrest of a bed.

7. The upper garment dresser as claimed in claim 1, wherein said upper garment has a back portion and a front portion which are joined at the top but are otherwise free to open up.

8. The upper garment dresser as claimed in claim 7, wherein the back portion and front portion of said upper garment can be secured together at their sides.

9. The upper garment dresser as claimed in claim 8, wherein the back portion and front portion are connectable with flaps, straps or other means at their sides.

10. The upper garment dresser as claimed in claim 9, wherein said upper garment dresser comprises means to connect or disconnect the flaps, straps or other means on either side of said patient.

11. The upper garment dresser as claimed in claim 1, wherein said means for picking up an upper garment comprises a suction means or grasping means.

12. The upper garment dresser as claimed in claim 1, further comprising storage means for storage of upper garments in pre-defined positions or stacks.

13. The upper garment dresser as claimed in claim 1, further comprising storage means for storage of soiled upper garments in pre-defined position.

* * * * *